Aug. 7, 1962     G. V. ANDERSON     3,047,893
CAN WASHER
Filed Oct. 6, 1959     3 Sheets-Sheet 1
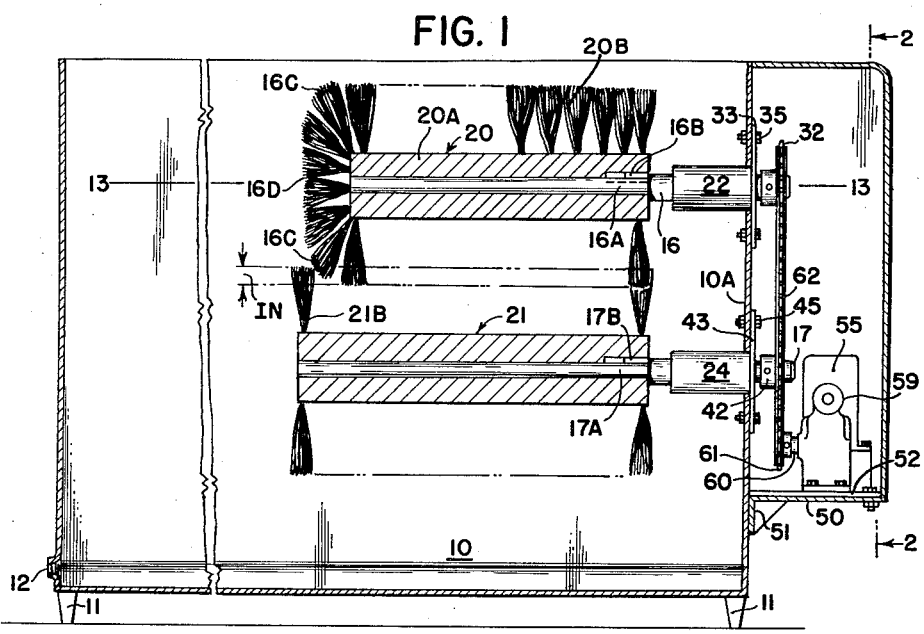
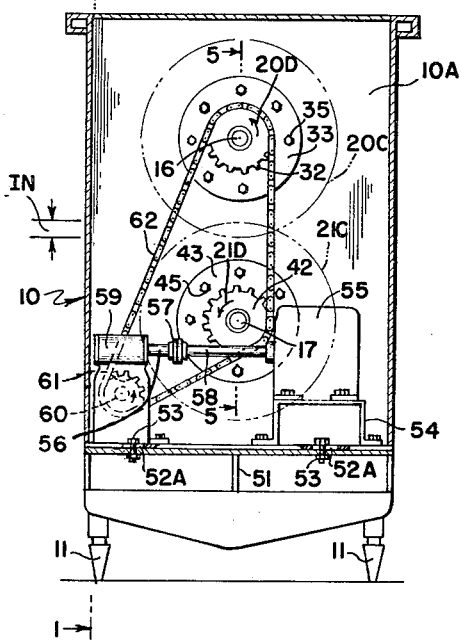
*INVENTOR.*
GLENN V. ANDERSON
BY *Dugger & Johnson*
ATTORNEYS Aug. 7, 1962 G. V. ANDERSON 3,047,893
CAN WASHER
Filed Oct. 6, 1959 3 Sheets-Sheet 2
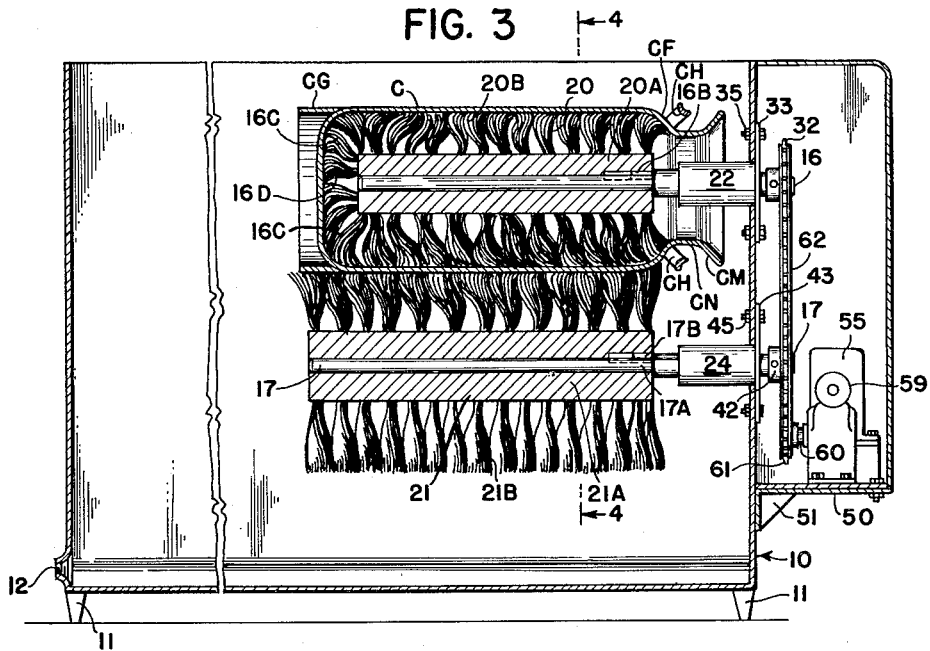
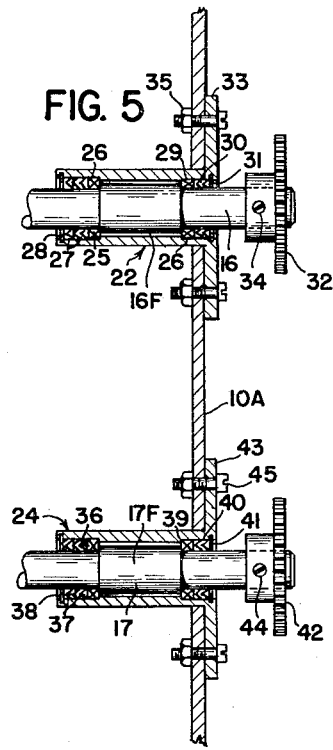
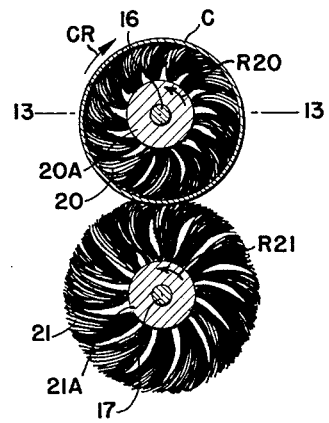
INVENTOR.
GLENN V. ANDERSON
BY *Dugger & Johnson*
ATTORNEYS Aug. 7, 1962

G. V. ANDERSON 3,047,893

CAN WASHER

Filed Oct. 6, 1959

INVENTOR.
GLENN V. ANDERSON

BY Dugger & Johnson

ATTORNEYS

United States Patent Office 3,047,893
Patented Aug. 7, 1962

---

3,047,893
CAN WASHER
Glenn V. Anderson, Welch, Minn., assignor to Tonna Engineering Company, Inc., Owatonna, Minn., a corporation of Minnesota
Filed Oct. 6, 1959, Ser. No. 844,665
9 Claims. (Cl. 15—71)

This invention relates to an apparatus for washing milk and cream cans. In the dairy trade milk is frequently carried in milk cans from the farms to creameries and in many instances milk, after having been processed in the creamery for pasteurizing, homogenizing and fortifying the milk, the product is again placed in dispensing cans and conveyed to retail establishments from which the product is directly dispensed into glasses for serving to the customers. For sanitary reasons the milk or cream cans must be washed and sterilized after each use and it is standard practice to wash and sterilize the cans before they are returned to the farmers, or before refilled with milk or cream at the creamery for dispensing the product commercially. The standard washing operation is carried out by jet washer apparatus without brushing, and with the use of suitable detergents and steam, and thereafter hot air is applied for drying the cans.

As a result of such standard washing, sterilizing and drying operations, a certain amount of residue will gradually build up on the surface of the cans, both exterior and interior. For the most part this residue will at least initially be a slight film or haze, which is composed of the solid contents of the washing or rinsing water. This haze will remain on the metallic surface of the can after drying and will be there at the time of next washing, which may be within a day or so. The haze acts as an area for accumulation of further such material which during the ensuing operation builds up a further deposit. After the can has been sent through the washing, sterilizing, and drying operation, a number of times, a sensible incrustation will be built up. This incrustation is known in the trade as "milk stone."

Such solid material or "milk stone" is deleterious, it is unsightly, and it must be removed in order to meet adequate standards of sanitation. The removal of the "milk stone" or other unsanitary incrustations, however, designated, from the interior and exterior of milk and cream cans is usually done by hand scrubbing with a hand brush.

While the art has heretofore provided certain machines for doing this, their operation has been unsatisfactory and such machines have been expensive to build, maintain, and operate. Therefore, for the most part, the washing of cans for removal of "milk stone" has been carried out as a hand operation.

It is an object of the invention to provide an improved milk can washing machine. It is a further object of the invention to provide an improved milk can washing machine which is capable of being used by unskilled help and which will provide adequate removal of milk stone and other deleterious incrustations on the inside and outside of milk cans. It is also an object of the invention to provide an improved milk can washing machine which may be manufactured at low cost and used by unskilled help and still provide adequate and even exceptional washing results. It is a further object of the invention to provide an improved milk can washing machine providing brushes for simultaneously scrubbing the interior and exterior of the can and for rotating the can automatically without other than supervisory attention of the operator and loading and unloading. It is another object of the invention to provide improved milk can washing machines wherein two cylindrical brushes are provided, one above the other and located so that the outer ends of the bristles of the brushes interlap. It is another object of the invention to provide an improved milk can washing machine wherein two brushes are located one above the other and in which the milk can during the brushing operation is positioned on the upper brush. It is another object of the invention to provide an improved milk can washing machine wherein two cylindrical brushes are located one above the other and positioned so that the circle of movement of the tips of the bristles of one brush interlap the circle of movement of the tips of the bristles of the other brush, during rotation and means is provided for rotating the brushes so that the bristles move in opposite directions where they interlap.

Other and further objects are those inherent in the invention herein illustrated, described, and claimed and will be apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is a vertical sectional view of the one form of can washing machine made in accordance with the present invention, this sectional view being taken along the line and in the direction of arrows 1—1 of FIGURE 2. In FIGURE 1 no can is shown on the upper brush of the machine;

FIGURE 2 is a transverse vertical sectional view taken along the line and in the direction of arrows 2—2 of FIGURE 1;

FIGURE 3 is a longitudinal vertical sectional view corresponding to FIGURE 1 and showing a can in place during the scrubbing operation;

FIGURE 4 is a fragmentary vertical sectional view taken along the line and in the direction of the arrows 4—4 of FIGURE 3, illustrating the position of the can with reference to the brushes during the can scrubbing operation;

FIGURE 5 is an enlarged fragmentary vertical sectional view taken along the line and in the direction of arrows 5—5 of FIGURE 2, illustrating the construction of the brush shaft mounting journal, the shafts and drive sprockets;

Figure 6:
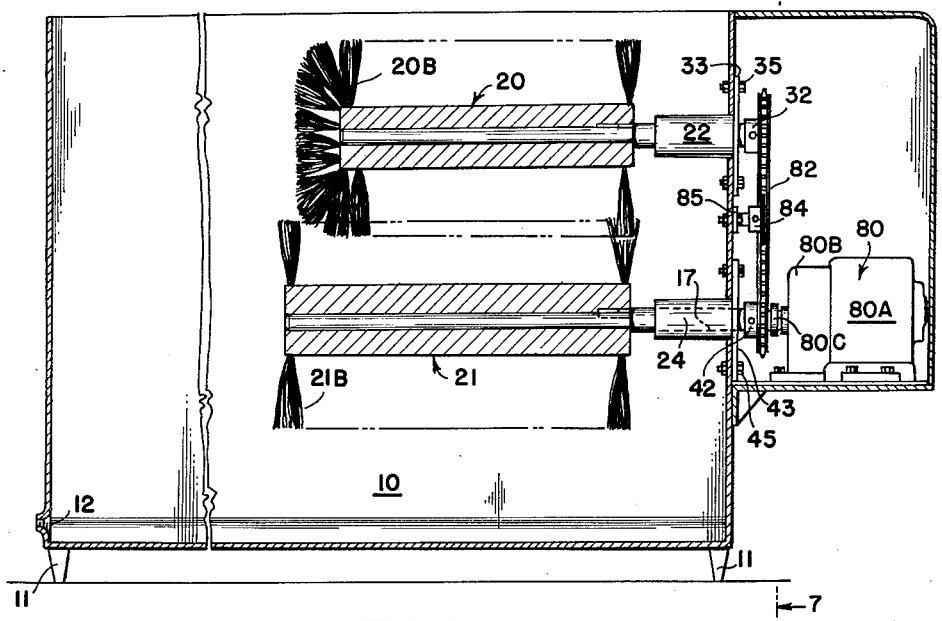
FIGURE 6 is a longitudinal vertical sectional view corresponding to FIGURE 1 and showing a slightly modified form of the invention.

Referring to FIGURES 1-5, the machine comprises a tank generally designated 10 having a plurality of feet 11, which serve to support it above the floor on which the machine is operated. The tank is preferably made of relatively heavy sheet metal and is either made of non-corrosive metal or is galvanized or cadmium plated so as to be unaffected by water and detergent compounds. The tank is normally provided with a drain at 12 by which the contents of the tank may be emptied, it being normal that the water level within the machine is carried at about the level of the upper brush shaft, i.e. the lines 13—13 of FIGURE 1. The tank is sufficiently long so that a can may conveniently be slipped onto the upper brush by sliding the open mouth of the can onto the end of the brush.

The right end wall of the tank is preferably made of sufficiently heavy material so as to form a framing on which the brush shafts, which are now to be described, are mounted. The machine has two brush shafts, 16 which is the upper shaft, and 17 which is the lower shaft. These are identical except as to length and are provided with reduced end portions 16A and 17A respectively, and with keys at 16B and 17B by means of which the brushes generally designated 20 and 21 may be mounted and keyed on. Each brush is composed of a central hub 20A or 21A into which bristles are set all around throughout the length of the hub. The upper brush 20 is also provided with bristles extending outwardly around the end zone 16C, 16D, 16C of the brush. The end zone of the brush 20 is intended for scrubbing the rounded junction between the bottom of the can as well as the bottom of the can. The lower brush 21 is normally made slightly longer than the upper brush and is not provided with the end zone bristles.

The upper brush shaft 16 is journalled in anti-friction bearings within the journal housing 22 and the lower brush 17 is similarly journalled on anti-friction bearings in the lower journal housing 24. These journal housings are identical and therefore only the one need be described.

Referring to the upper journal housing 22 it is provided with recesses at each end, the recess 25 being toward the tank side and the recess 26 toward the outside. The recess 25 is made to receive an anti-friction bearing 26 and a pair of shaft seals 27. The shaft seals and journals are held in place by snap-ring 28. Between the journal 26 and the opposite journal 29 (which is toward the outside end of the housing), the shaft 16 is enlarged slightly as at 16F. The journals 26 and 29 sit against the shoulders formed by this shaft enlargement. At the outer end adjacent bearing 29 there is provided the shaft seal 30 and it and the journal held in place by the snap-ring 31. The shaft 16 extends all the way through and at the outer end there is provided a chain sprocket 32 which is held in place by a pin or key 34. Similarly the bottom shaft 17 is provided with an enlargement at 17F against which are seated the two journals 36 and 39. The inner journal has seated against it the pair of shaft seals 37 held in place by the snap-ring 38 while the outer journal 39 has seated against it the seal 40 held in place by the snap-ring 41. On the lower shaft 17, at the outer end there is provided a sprocket 42 which is preferably, but not necessarily, of the same diameter as the sprocket 32 on the shaft 16, sprocket 42 being held in place by a pin or key 44. The journal housing 22 is provided with a flange 33, 33 and the journal housing 24 is provided with a flange 43, these flanges are secured by bolts 35 for the flange 33 and bolt 45 for the flange 43, to the end wall 10A of the tank. If desired, the two journals can be fastened to a common bolting flange, which gives rigidity.

Referring to FIGURES 1 and 2, the end wall is provided with an outstanding bracket at 50 having a brace 51 so that it will be sufficiently strong. On this there is mounted a bedplate 52 having slots at 52A—52A through which the bolts 53—53 are placed for holding the bedplate on the bracket plate 50. The reason for this construction is to provide a slight sliding motion for the bedplate 52 with reference to the bracket plate 50 for tightening the chain.

Upon the bedplate there is mounted a stand 54 which serves as a perch for the motor 55 which has a shaft 58 connected by the flexible coupling 57 to the input shaft 56 of a worm type speed reducer 59, which is in turn mounted on the sliding plate 52. Then output shaft 60 of the speed reducer is provided with a sprocket 61. Normally the motor 55 will have a speed of about 1760 r.p.m. and the speed reducer 59 is made preferably to have a speed reduction of 16–18 to 1 or thereabout thereby providing an output shaft speed for shaft 16 of approximately 90–110 r.p.m. The sprocket 61 is aligned with the sprockets 32 and 42 and a continuous chain 62 is run over the sprocket 61, sprockets 32 and 42. When the motor is energized and is running the sprockets 42 and 32 are then rotated and when the sprockets are of the same size they will be rotated at the same speed. The sprockets, and hence the brushes, are rotated in the same direction.

Referring to FIGURES 1 through 3, particularly FIGURE 2 it will be noted that the tips of the bristles 20B of the upper brush 20 describe a circle indicated by the circular lines 20C and that similarly the tips of the bristles 21B of the lower brush 21 described a circle indicated by the circular lines 21C. The two circles 20C and 21C interlap or cross each other. Thus, for the usual size of cream and milk can which has a diameter of approximately 12½", the diameter of both of the brushes 20 and 21 will be made approximately 16 inches and the amount on interlap, designated by the reference letters IN, in FIGURES 1 and 2, is made approximately 1½–2". It will also be observed that since the sprockets 32 and 42 are rotated in the same direction, that the tips of the bristles 20B of brush 20 and the tips of the bristles 21B of brush 21 move in opposite directions at the place where interlapping occurs. This is shown by the arrows 20D and 21D in FIGURE 2.

Ordinarily this interlapping might be considered as disadvantageous but it has been discovered that extraordinarily good results and an unexpected operation automatically takes place due to this arrangement. When a can is drawn onto the upper brush 20 as it is rotating, the bristles of the upper brush first enter into the mouth CM of the can and scrub the mouth as well as scrubbing the neck CN and the flair CF of the can. Then after the can has been entered to the full position as shown in FIGURE 3, the end bristles 16C—16D—16C scrub the bottom of the can and the rounded corner between the bottom and the can sidewall. The operator then releases the can after it has been drawn onto the brush 20, and the weight of the can causes the can to assume a position such that the axis of rotation of the can is slightly below the axis of rotation of the brush 20, this being illustrated in FIGURES 3 and 4. The rotation of the upper brush 20 causes the bristles of the upper brush to be dragged backwardly due to their scrubbing effects against the interior of the can, and those bristles in the upper one-half of the brush 20, above the line 13—13 are bent a little more than the bristles in the lower half of the brush 20. At the same time the exterior of the can is engaged by the tips of the bristles of the brush 21.

It might be supposed that the large number of bristles in contact with the interior of the can C would cause the can C to rotate in the same direction as the upper brush 20 but this is not the case. It was discovered that the can C rotates in the direction of the arrows CR, which is opposite to the direction of rotation of the brush as indicated by the arrow R20. Even though a relatively much smaller number of bristles of brush 21 engaged the exterior of the can, these bristles of the lower brush establish the rotation of the can. Thus in a device using brushes of the same size (16" diameter) with the upper and lower brushes interlapped approximately 1½", and energized and rotating at the approximate speed of 100 r.p.m., in the direction as shown by the arrow R20 for the upper brush and in the direction of R21 for the lower brush, the can under such conditions will slowly rotate in the direction of the arrow CR, accordingly bringing all portions of the exterior cylindrical surfaces of the can into contact with the tips of the bristles of the brush 21. In this connection it will be noted that all cream and milk cans have a ground ring CG at their lower portions in order to hold the bottom of the cans off the surface on which it is placed and cans normally have a pair of handles CH at their upper portions. The operator, when putting the can on and taking it off the upper brush will permit it to rotate slightly so that the exterior of the converging portion CF of the exterior of the next CN and the exterior of the mouth portion CM will all be engaged to some extent by the bristles of the brush 21. The operator also has a hand brush and as the can C slowly rotates during the brushing operation, the operator will grasp that can and hence hold it from rotating and while so doing brush those portions of the can around the handles CH—CH and any portions of the exterior of the upper portion of the can that need to be given extra attention. At the same time the operator may if desired brush the underside of the bottom of the can and the interior of the ground support ring CG of the can. After several revolutions of the can the inside has been thoroughly scrubbed due to the fact that the upper brush turns in counter-rotation to the observed rotation of the can. The can is then withdrawn from the upper brush and is sent on to the usual spray washing and steam sterilizing and drying operations.

It has been found that by use of applicant's invention the exterior and interior surfaces of the can are gradually brought back to a bright and highly polished surface. Thus, by constant brushing the tinned surfaces of the usual milk cans are brought to a high buff, which provides no lodging places for any cleaning compounds, dirt, or "milk stone."

Figure 7:
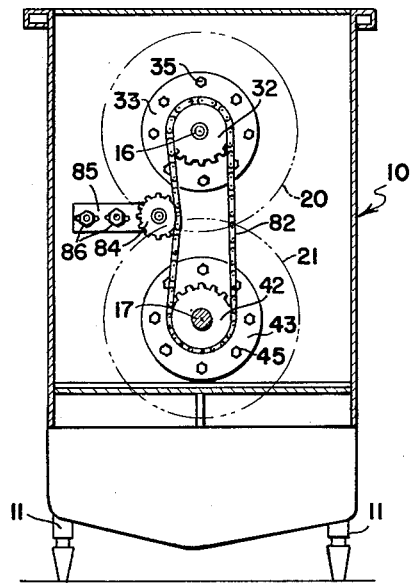
FIGURE 7 is a transverse vertical sectional view taken along the lines and in the direction of arrows 7—7 of FIGURE 6, of said modified form of the invention.

Referring to FIGURES 6 and 7, in these figures there are illustrated a modified form of the invention which is identical in all respects except for the drive. In FIGURES 6 and 7 the motor and gear box, which are separate units in FIGURES 1 and 2 are made in a combined speed reduction motor generally designated 80, the motor proportion being at 80A and the speed reducer at 80B. The output shaft 80C is aligned and coupled directly to the lower shaft 17 of the brushing machine. The lower shaft is provided with its usual sprocket 42 and the upper shaft with its usual sprocket 32 and these are connected by a chain 82, which also runs over an idler 84, which is mounted upon the adjustment bar 85 and is provided with slots and bolts 86 so that the chain may be kept at a constant tightness. The use of the combined motor and speed reducer somewhat reduces the expense and permits the use of a shorter chain and only two sprockets, and has certain other cost advantages. This form of construction is preferred.

As many widely apparently different embodiments may be made without departing from the spirit and scope thereof, it is to be understood that I do not limit myself to the specific embodiments herein.

What I claim is:

1. A can washing machine comprising an open-top washing vat, a pair of cylindrical brushes mounted for rotation in said vat, substantially aligned one above the other, on axes substantially horizontal which are substantially parallel, at least the upper brush being supported only at one end so as to permit a can to be slipped onto it for brushing, the axes of the brushes being so spaced that the path of movement of the tips of the bristles of one brush intersect the path of movement of the tips of the bristles of the other brush, and means for rotating said brushes so that the bristles of one brush move in a direction opposite to the direction of movement of the bristles of the other brush where their paths of motion intersect, the bristles of said brushes being sufficiently densely set about a substantial portion of the periphery of the brush so that they will substantially support and rotate the can relative to the bristles of each of the brushes when the can is on the upper brush and the bristles are in a deflected condition.

2. A can washing machine comprising an open-top washing vat, a pair of cylindrical brushes mounted for rotation in said vat, substantially aligned one above the other, on substantially horizontal axes which are substantially parallel, at least the upper brush being supported only at one end so as to permit a can to be slipped onto it for brushing, said upper brush being axially shorter than the lower brush and provided with bristles around its end for brushing the bottom of a can placed thereon, the axes of the brushes being so spaced that the path of movement of the tips of the bristles of one brush intersect the path of movement of the tips of the bristles of the other brush, and means for rotating said brushes so that the bristles of one brush move in a direction opposite the direction of movement of the bristles of the other brush where their paths of motion intersect, the bristles of said brushes being sufficiently densely set about a substantial portion of the periphery of the brush so that they will substantially support and rotate the can relative to the bristles of each of the brushes when the can is on the upper brush and the bristles are in a deflected condition.

3. A can washing machine comprising a vat for holding washing liquid, said vat having an access opening at the top, a pair of journals extending substantially horizontal through a sidewall of the tank from the exterior to the interior thereof, said journals being spaced one above the other and with their journal axes parallel, a pair of brush shafts extending from the exterior of the vat through the journals and into the vat, a cylindrical brush mounted on each shaft substantially aligned one above the other, the diameters of the brushes being such in respect to the distance between the shafts that the path of movement of the tips of the bristles of one brush intersects the path of movement of the tips of the bristles of the other brush, and drive means connected to the ends of the brush shafts on the outside of the vat for rotating said shafts and the brushes thereon in directions such that the bristles of one brush move in a direction opposite to the direction of movement of the bristles of the other brush where their paths of motion intersect, the bristles of said brushes being sufficiently densely set about a substantial portion of the periphery of the brush so that they will substantially support and rotate the can relative to the bristles of each of the brushes when the can is on the upper brush and the bristles are in a deflected condition.

4. The can washing machine specified in claim 3 further characterized in that said drive means comprises drive sprockets on the ends of each brush which are outside the vat and chain means connecting said sprockets and drive means connected thereto for rotating the sprockets, shafts, and brushes simultaneously.

5. The can washing machine specified in claim 3 further characterized in that said journals are provided with shaft seals on at least that end of the journal which is within the vat.

6. The can washing machine specified in claim 3 further characterized in that the brushes are of substantially the same diameter.

7. The can washing machine specified in claim 3 further characterized in that the distance between the axes of the brushes is from about 75% to about 95% of the average of the diameters of the brushes.

8. Apparatus for washing a can comprising a vertical frame member, a pair of cylindrical brushes, means for mounting said brushes on the frame member to rotate about fixed parallel horizontal axes with one brush substantially aligned with the other brush above the other and the brushes spaced to have the path of movement of the tips of the bristles of one brush intersect the path of movement of the tips of the bristles of the other brush, said mounting means supporting the upper brush only at one end so as to permit a can to be slipped onto it for brushing, the diameter of the upper brush being greater than the inside diameter of the can, and drive means for rotating said brushes in the same direction, the bristles of said brushes being sufficiently densely set about a substantial portion of the periphery of the brush so that they will substantially support and rotate the can relative to the bristles of each of the brushes when the can is on the upper brush and the bristles are in a deflected condition.

9. The apparatus of claim 8 further characterized in that the upper brush is shorter than the lower brush and that the upper brush at the unsupported end has bristles for brushing the bottom of the can.

References Cited in the file of this patent

UNITED STATES PATENTS

| | | |
|---|---|---|
| 1,960,530 | Doering et al. | May 29, 1934 |
| 2,445,707 | Brown et al. | July 20, 1948 |
| 2,973,534 | Gilderbloom | Mar. 7, 1961 |

FOREIGN PATENTS

| | | |
|---|---|---|
| 4,945 | Great Britain | 1908 |
| 105,219 | Switzerland | June 2, 1924 |
| 251,209 | Germany | Sept. 28, 1912 |
| 375,858 | France | May 25, 1907 |